(12) United States Patent
Kim

(10) Patent No.: US 7,417,378 B2
(45) Date of Patent: Aug. 26, 2008

(54) APPARATUS FOR CONTROLLING LIGHTING LAMP WITH SECURITY FUNCTION AND LIGHTING CONTROL METHOD USING THE SAME

(76) Inventor: Jihn-Kuk Kim, 925-13 Bangbae-Dong, Seocho-Gu, Seoul, 137-060 (KR)

( * ) Notice: Subject to any disclaimer, the term of this patent is extended or adjusted under 35 U.S.C. 154(b) by 11 days.

(21) Appl. No.: 11/517,720

(22) Filed: Sep. 7, 2006

(65) Prior Publication Data

US 2007/0081335 A1   Apr. 12, 2007

Related U.S. Application Data

(63) Continuation-in-part of application No. 10/494,856, filed as application No. PCT/KR02/02070 on Nov. 6, 2002, now abandoned.

(51) Int. Cl.
*H05B 37/02* (2006.01)
(52) U.S. Cl. .......................... 315/149; 315/159
(58) Field of Classification Search ............ 315/32, 315/129, 134, 135, 149, 360, 159; 362/276, 362/800, 802
See application file for complete search history.

(56) References Cited

U.S. PATENT DOCUMENTS

| | | | |
|---|---|---|---|
| RE38,036 E * | 3/2003 | Neumann | 250/214 AL |
| 6,580,221 B2 * | 6/2003 | Hutzler et al. | 315/149 |
| 6,703,786 B2 * | 3/2004 | Tannenbaum | 315/149 |
| 6,946,805 B2 * | 9/2005 | Segan et al. | 315/291 |
| 2004/0263084 A1 * | 12/2004 | Mor et al. | 315/159 |
| 2005/0212443 A1 * | 9/2005 | Yukawa et al. | 315/129 |

* cited by examiner

*Primary Examiner*—Hung T Vy
(74) *Attorney, Agent, or Firm*—G W i P S

(57) ABSTRACT

An apparatus for controlling a lamp with a security function and a lighting control method are disclosed. The apparatus includes a security switch for selecting a security mode, a light emitting diode for displaying security status, a lamp, an illuminance sensor set to a predetermined illuminance value for detecting illuminance of the lamp so that varying time is confirmed according to the predetermined illuminance value, a timer and a microcontroller for receiving an illuminance detection signal if the security mode is activated and controlling the lamp. The microcontroller confirms the varying time twice daily according to the predetermined illuminance value, sets intermediate time between the corresponding twice daily time on a virtual timepiece and turns the lamp on at a specific dusk time period, a specific midnight time period and a specific dawn time period according to the virtual timepiece.

1 Claim, 5 Drawing Sheets

APPARATUS FOR CONTROLLING LIGHTING LAMP WITH SECURITY FUNCTION AND LIGHTING CONTROL METHOD USING THE SAME

CROSS-REFERENCE TO RELATED APPLICATIONS

Pursuant to 35 U.S.C. § 120, this application is a continuation-in-part of U.S. patent Ser. No. 10/494,856, filed on May 6, 2004, which is ABN on May 6, 2004 which claims priority to PCT/KR02/02070, filed on Nov. 6, 2002, the contents of which are hereby incorporated by reference herein in their entirety.

FIELD OF THE INVENTION

The present invention relates to an apparatus for controlling a lighting lamp with a security function and lighting control method using the same, and more particularly to an apparatus for controlling a lighting lamp with a security function, which is capable of variably controlling the lighting lamp at a specific time period using a timer and an illuminance sensor, and a lighting control method using the same.

DESCRIPTION OF THE RELATED ART

In general, a burglar surveys a victim's house such as a specific apartment, a single house, and the like. In addition, the burglar selectively surveys a house whose lighting lamp remains on after dusk, and determines whether the house is empty. When the burglar confirms that the house is empty, the burglar breaks into the house. Thus, if the lighting lamp in the house remains on after dusk, a burglar may assume that the house is still empty. When many people their homes during a national holiday or for a long time, or when they come house late, they tend to turn on an indoor lamp using a conventional wall switch as shown in FIG. 1. Herein, FIG. 1 is a circuit diagram showing the configuration of a conventional wall switch.

In the above case, since the lighting lamp remains on during the daytime, electricity may be wasted. If the lighting lamp of the house remains on throughout the day during a national holiday, the burglar may survey the house. In addition, even when the house is empty for a long time, it is meaningless that the lighting lamp of the house remains on or off throughout the period of time. In other words, up to now, there is no apparatus for decreasing electricity consumption and simultaneously for switching on the lighting lamp for a specific time period.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

Therefore, the present invention has been made in view of the above problems, and it is an object of the present invention to provide an apparatus for controlling a lighting lamp with a security function and a lighting control method using the same, wherein, by variably controlling the lighting lamp at a specific dusk time period, a specific midnight time period and a specific dawn time period using a timer, it is possible to accomplish the security function, and by detecting sunrise and sunset using an illuminance sensor at each predetermined period, and automatically setting intermediate time between the start-time and end-time of night to reference time of the switch which is predetermined by the timer, the lighting lamp can be turned-on for a desired time period with no regard to season and a switch arrangement location.

In one aspect of the present invention, an apparatus for controlling a lamp to provide a security function is provided. The apparatus includes a security switch for selecting a security mode, a light emitting diode (LED) for indicating a status of the security mode according to manipulation of the security switch, a lamp adapted to be automatically turned on for a specific time period when the security mode is set in order to perform a security function, an illuminance sensor set to a predetermined illuminance threshold and adapted to detect a varying time period according to the predetermined illuminance threshold and to output an illuminance detection signal, a timer adapted to measure time to identify when the specific time period has elapsed and a microcontroller adapted to receive the illuminance detection signal from the illuminance sensor if the security mode is selected and to control the lamp, wherein the microcontroller detects the varying time period by determining when the illuminance detector detects a transition of an illuminance value from below the predetermined illuminance threshold to above the predetermined illuminance threshold and determining when the illuminance detector detects a transition of an illuminance value from above the predetermined illuminance threshold to below the predetermined illuminance threshold, sets an intermediate time between the two determined transitions to 12:00 PM on a virtual timepiece as a reference time, performs the security function by controlling the lamp to be automatically turned on for a specific time period at dusk, a specific time period at midnight and a specific time period at dawn, the specific time periods preset by the virtual timepiece according to the security mode selected by the user, and updates a turn on time of the lamp by automatically applying a varying value of the virtual timepiece which corresponds to a variation of a time between sunset and sunrise.

In another aspect of the present invention, a method for controlling a lamp to provide a security function is provided. The method includes inputting a security key, determining whether the security key is manipulated, performing a normal on/off switching function of the lamp if the security key is not manipulated, performing a security function if the security key is manipulated, displaying a message indicating that the security function is in progress, storing a first varying time when the illuminance value detected by the illuminance sensor is below the predetermined illuminance threshold, detecting turn on time and turn off time of the lamp according to a previous reference time of the virtual timepiece, storing a second varying time when the illuminance value detected by the illuminance sensor is above the predetermined illuminance threshold, setting an intermediate time of the virtual timepiece to 12:00 PM, the intermediate time between the first time and the second time and controlling the lamp to be turned on for specific time periods that are preset according to the virtual timepiece, the specific time periods corresponding to a variation of the time between sunset and sunrise.

In another aspect of the present invention, a method for controlling a lamp to provide a security function is provided. The method includes determining that the security function is selected, determining a current actual time period according to a detected luminance, the time period corresponding to a time between a current sunset and a current sunrise and determined by detecting a first actual time when a detected illuminance value transitions from a luminance value above a predetermined threshold to a luminance value below the predetermined threshold and detecting a second actual time when a detected illuminance value transitions from a luminance value below the predetermined threshold to a luminance value above the predetermined threshold, setting an intermediate time of a virtual time reference, the intermediate time between the first time and the second time, determining a turn on time and turn off time of the lamp according to a previous actual time period, the time period corresponding to a time between a previous sunset and a previous sunrise and controlling the lamp to be turned on for specific time periods that are preset according to the virtual time reference, the specific time periods corresponding to a variation of the actual time between sunset and sunrise.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

The above and other objects, features and other advantages of the present invention will be more clearly understood from the following detailed description taken in conjunction with the accompanying drawings, in which.

BRIEF DESCRIPTION OF THE REFERENCE DESIGNATORS

AC In: commercial alternating current input
Lamp: lighting lamp
SW In switch input terminal
SW Out: switch output terminal
1: power circuit block
2: AC input phase detection block
3: triac driving block
4: control block
U1: microcontroller
TRC: triac
G: gate terminal of triac
I1~I4: input terminals of microcontroller
O1~O4: output terminals of microcontroller
SW1: power On/Off switch
SW2: security switch
LED: light emitting diode
CDS: illuminance sensor
VDD: DC (+) terminal
VSS: DC ground terminal

DETAILED DESCRIPTION OF THE PREFERRED EMBODIMENTS

Now, preferred embodiments of the present invention will be described in detail with reference to the annexed drawings.

Figure 1:
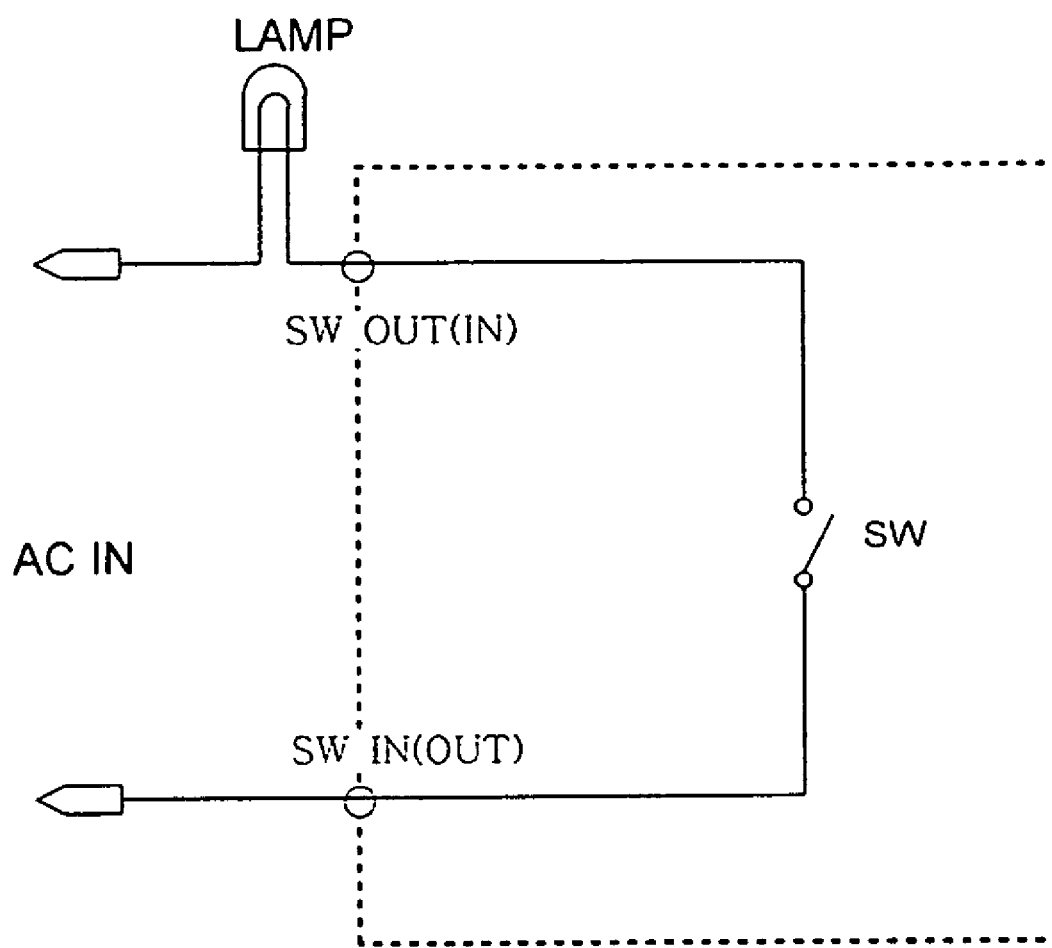
FIG. 1 is a circuit diagram showing the configuration of a conventional wall switch.
Figure 2:
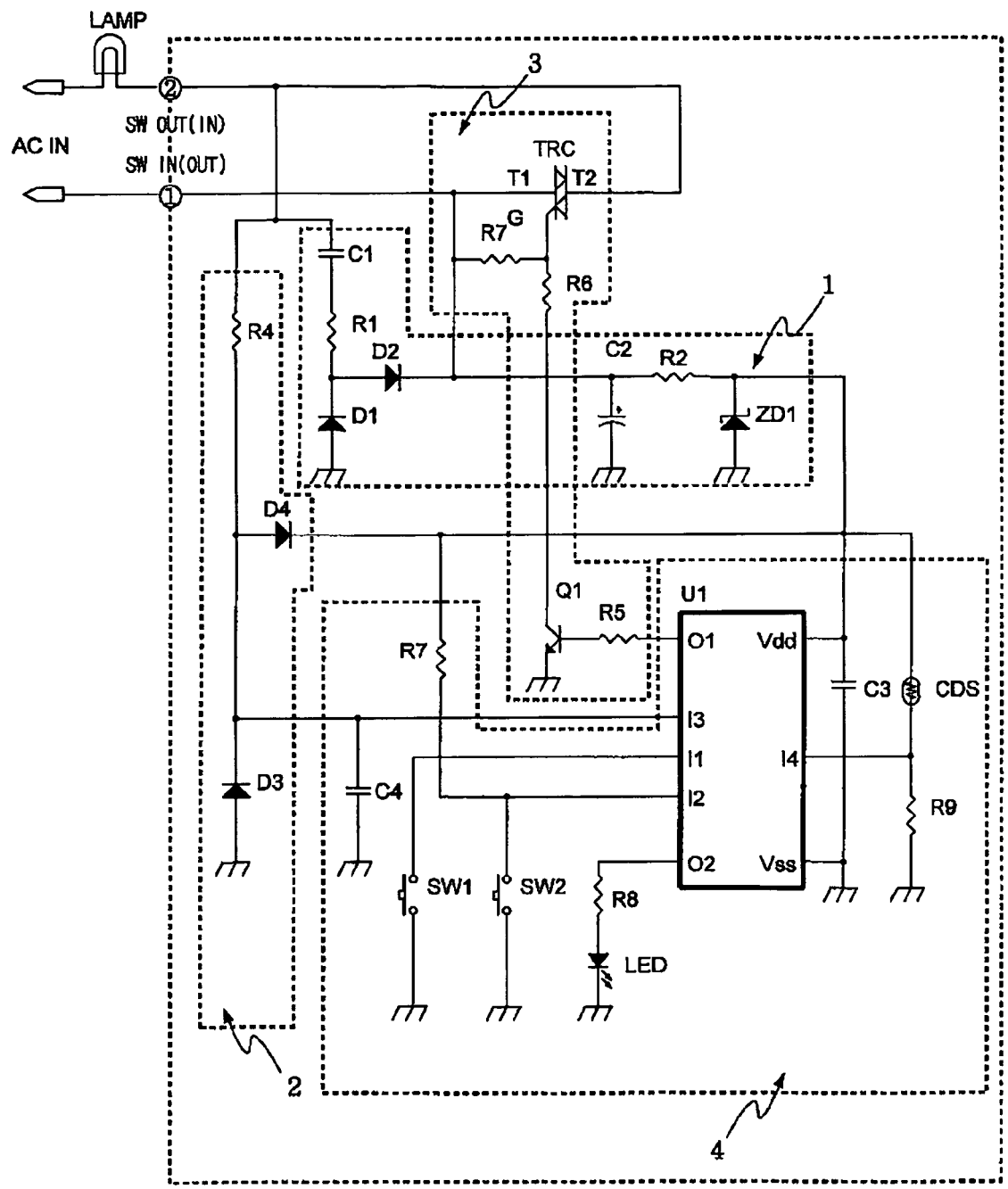
FIG. 2 is a circuit diagram showing the configuration of an apparatus for controlling a lighting lamp with a security function according to an embodiment of the present invention.
Figure 3:
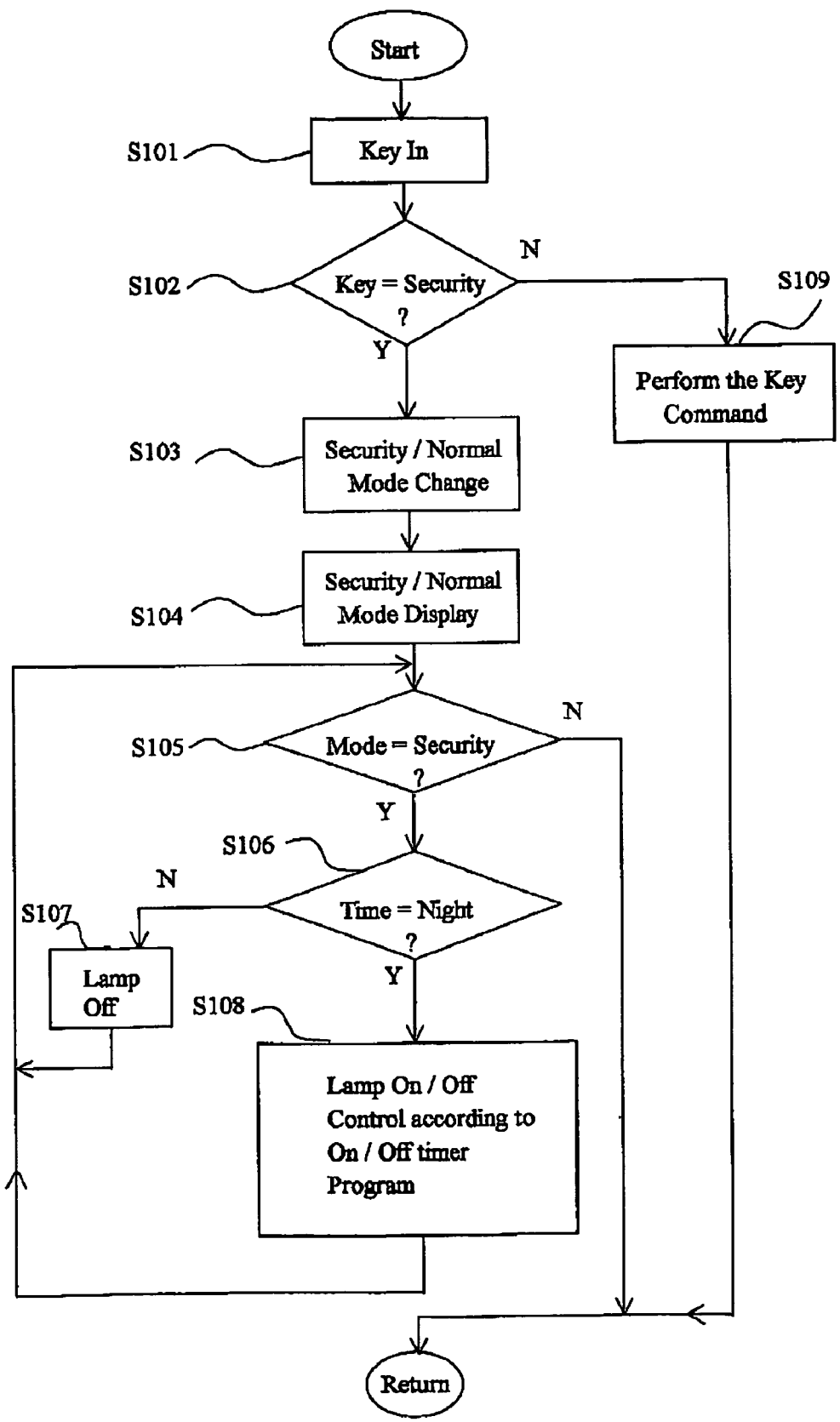
FIG. 3 is a flowchart illustrating a lighting control method using an apparatus for controlling a lighting lamp with a security function according to an embodiment of the present invention.

FIG. 2 is a circuit diagram showing the configuration of an apparatus for controlling a lighting lamp with a security function according to an embodiment of the present invention. FIG. 3 is a flowchart illustrating a lighting control method using an apparatus for controlling a lighting lamp with a security function according to an embodiment of the present invention.

Referring to these drawings, the embodiment of the present invention provides the apparatus for controlling the lighting lamp with the security function according to the embodiment of the present invention, wherein, by variably controlling the lighting lamp at a specific dusk time period, a specific midnight time period and a specific dawn time period using a timer, it is possible to accomplish the security function, and by detecting sunrise and sunset using an illuminance sensor at each predetermined period, and automatically setting intermediate time between the start-time and end-time of night to reference time of the switch which is predetermined by the timer, the lighting lamp can be turned-on for a desired time period with no regard to season and a switch arrangement location.

More particularly, SW IN (OUT) and SW OUT (IN) of FIG. 2 are terminals connected to a switch line in a wall. Reference numeral 1 is a power circuit block for driving an apparatus according to the present invention, and reference numeral 2 is an AC input phase detection block. In addition, reference numeral 3 is a triac driving block for switching the lighting lamp, and reference numeral 4 is a control block. The control block 4 substantially includes a microcontroller (U1) and a peripheral circuit block for controlling operations of the apparatus according to the present invention.

Terminals O1 and O2 of the microcontroller (U1) are output terminals, and terminals 11 to 14 of the microcontroller (U1) are input terminals. When a logical value 1 (high) is output from the first output terminal (O1), the triac (TRC) is turned-on, and thereby the lighting lamp is turned-on. When a logical value 0 (low) is output from the first output terminal (O1), the triac (TRC) is turned-off, and thereby the lighting lamp is turned-off.

The fourth input terminal (I4) of the microcontroller (U1) is an analog input terminal that is used when detecting brightness of the lighting lamp, and the first and second input terminals (I1 and I2) are key input terminals. When a logical value 1 (high) is output from the second output terminals (O2), the light emitting diode (LED) is turned-on to display a security mode. When a logical value 0 (low) is output from the second output terminals (O2), the light emitting diode (LED) is turned-off to cancel the security mode and to display a normal mode. The security mode and the normal mode are selected by pushing a second switch button (SW2). Whenever the second switch button (SW2) as a security switch is pushed, the security mode and the normal mode are toggled.

That is, when the second switch button (SW2) is operated one time, the operating mode of the apparatus is changed to the security mode. When the second switch button (SW2) is operated one more time, the operating mode of the apparatus is changed to the normal mode.

Meanwhile, in the normal mode, on/off of the lighting lamp is determined using a first switch button (SW1). In addition, in the security mode, on/off of the lighting lamp is controlled by a 24 hour-timepiece and an on/off timer program, wherein, the 24 hour-timepiece is activated when the microcontroller (U1) receives an illuminance value which is detected using an illuminance sensor, and the on/off timer program is loaded in the microcontroller (U1).

In order to operate the timepiece for displaying 24 hours, the microcontroller (U1) sets an intermediate time of daytime (an intermediate time from dawn to dusk) to 12:00 AM, and sets an intermediate time of nighttime (an intermediate time from dusk to dawn) to 12:00 PM. In the security mode, the lighting lamp is turned-on for 4 to 5 hours at dusk, for 1 to 2 hours at dawn, and for a moment one or two times at 12:00 PM under control of the microcontroller. The lighting lamp is turned-off at all other times.

That is, the apparatus for controlling a lighting lamp with a security function according to an embodiment of the present invention detects sunrise and sunset using an illuminance sensor in each predetermined period of time, and automatically updates the intermediate time into reference time of the switch set by the timer.

The reference time update is accomplished by the microcontroller (U1). Daytime and nighttime at a predetermined location continuously vary by the earth's revolution. Thus, it is very important that reference time be correctly set in order to switch on/off at predetermine time. For example, a nighttime length in some season may be set to 15 hours, and the nighttime length in another season may be set to 10 hours. Thus, the lighting lamp may be turned-on for 3 hours after nighttime starts, and the lighting lamp may be turned-on again for 1 hour in an intermediate period of time. In addition, the lighting lamp may be turned-on again for 2 hours at dawn. In order to turn-on the lighting lamp in the above manners, absolute time (i.e. actual time) for turning-on the lighting lamp according to the nighttime length must be distinctively updated for each day of the year.

In the case where the entire time of night is 12 hours, the lighting lamp may be turned-on from 06:00 PM to 09:00 PM, and the lighting lamp may be turned-on again from 00:00 AM to 01:00 AM. In addition, the lighting lamp may be turned-on again from 05:00 to 06:00 AM. The microcontroller (U1) controls the switch according to an on/off timer program in order to turn-on the lighting lamp in the above manners, wherein the microcontroller (U1) embeds the on/off timer program. In addition, the microcontroller (U1) detects sunrise, sunset and intermediate time using an illuminance sensor (CDS), and updates reference time.

On the other hand, in the case where the entire time of night is 9 hours from 08:00 PM to 05:00 AM in some season, the microcontroller (U1) detects sunrise, sunset and intermediate time using an illuminance sensor (CDS), and updates the reference time. Herein, the reference time is updated based on the intermediate time of the sunrise and sunset, for example, 00:30 AM.

Figure 4:
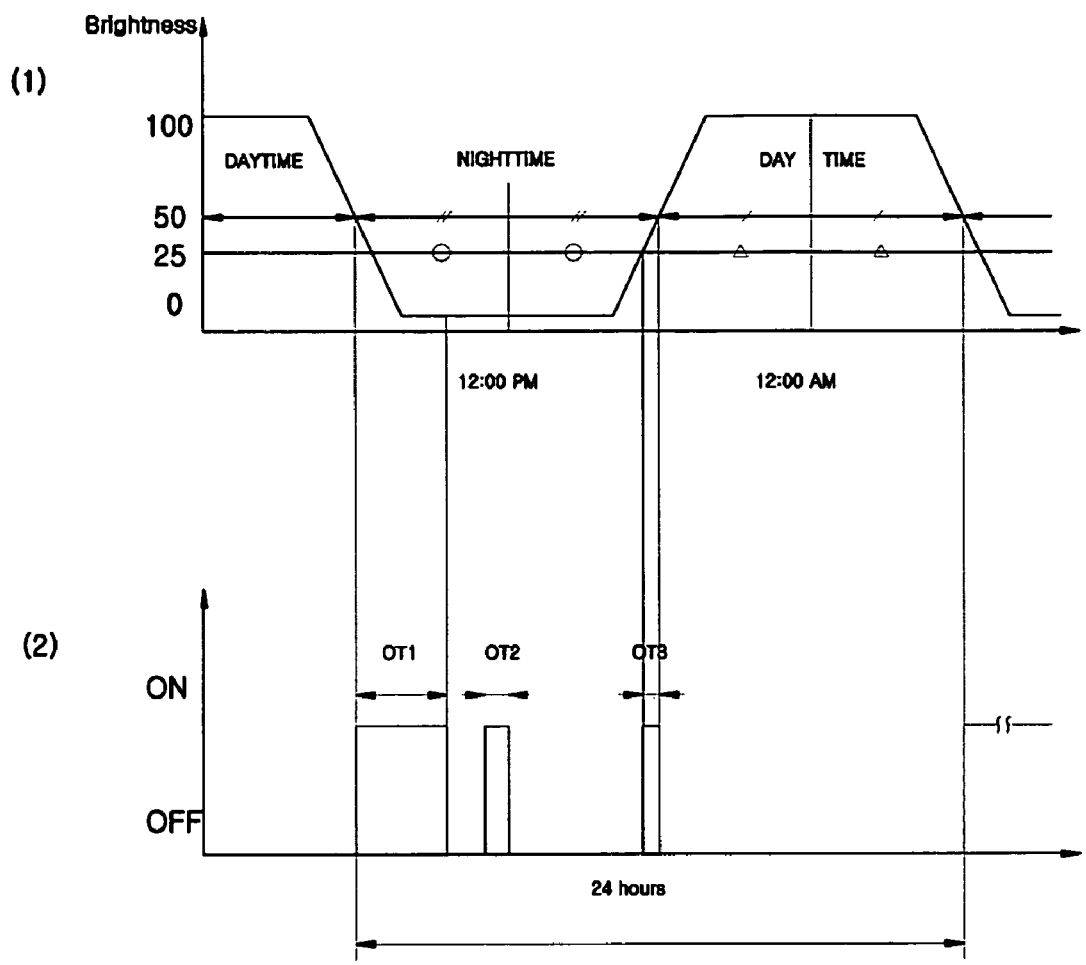
FIG. 4 is a view illustrating lighting lamp control states of an apparatus for controlling a lighting lamp with a security function according to an embodiment of the present invention.

Thus, to begin with, the microcontroller (U1) turns-on the lighting lamp from 08:00 PM to 11:00 PM and then turns-off the lighting lamp. Next, the microcontroller (U1) turns-on the lighting lamp from 00:30 AM to 01:30 AM, wherein 00:30 AM is the reference time. In addition, the microcontroller (U1) turns-on the lighting lamp from 04:00 AM to 05:00 AM at dawn. A timing diagram for such lighting lamp controls is shown in FIG. 4.

Meanwhile, the respective turn-on time may be changed according to the on/off timer program. In addition, the reference time, which is set to the on/off timer program in the microcontroller (U1) at the beginning, has an intermediate nighttime length that is a nighttime average value in a year.

Thus, in the case where the apparatus is installed at the predetermined location, the apparatus detects illuminance using the illuminance sensor (CDS), determines the nighttime length, and updates each lighting lamp turn-on time at a predetermined period of time such as everyday, every week, or the like.

More particularly, the apparatus according to the present invention can very easily set reference time, and since the apparatus must operate with no regard to a variation of a nighttime length and an installed location thereof, the apparatus may include a timepiece for representing real time and a timepiece for representing virtual time.

That is, the real timepiece is a timepiece used currently, and the virtual timepiece is a timepiece acknowledged in the microcontroller U1. The microcontroller U1 operates depending on the virtual timepiece with no regard to the real time. Thus, the reference time of the virtual timepiece is updated in response to a variation of the nighttime length, sunrise or sunset.

For example, the microcontroller (U1) controls the lighting lamp to be turned-on for 3 hours from 06:00 PM to 09:00 PM on the basis of the virtual timepiece, and controls the lighting lamp to be turned-on for 1 hour from 12:00 PM to 01:00 AM. In addition, in the case where the microcontroller (U1) sets the lighting lamp to be turned-on from 04:00 AM to 06:00 AM, the reference time which is set by the microcontroller (U1) is set to 12:00 PM that is intermediate time between 06:00 PM and 06:00 AM.

In the case where the nighttime length, sunrise period vary, and time from 07:00 PM to 06:00 AM is nighttime, 00:30 AM minute corresponding to intermediate time thereof is set to the reference time. Herein, since 12:00 PM on the virtual time is exchanged with 00:30 AM of the real time, the lighting lamp is turned-on from 06:30 PM of the real time, and remains on to 09:30 PM. In addition, the lighting lamp is turned-on from 00:30 AM to 01:30 AM, and is turned-on again from 04:30 AM to 06:30 AM.

As noted the above, the present invention sets the virtual reference time. That is, in the case where each lighting lamp turn-on time is previously predetermined according to the virtual timepiece, since the virtual timepiece is varied everyday based on the actual time, each lighting lamp turn-on time is varied based on the actual time. In order words, the time axis of the virtual timepiece is varied based on the actual time. According to the present invention, the lighting lamp automatically responds to a variation of installed location and nighttime length to be turned-on for the predetermined period of time.

In order to detect sunrise and sunset and set intermediate time of the nighttime to 12:00 PM of actual time, the illuminance must be detected. In this case, when the reference time of the virtual timepiece is set, the apparatus according to the present invention does not require an accurate sunset time. The apparatus only requires the same illuminance value, and then sets the reference time of the virtual timepiece using the illuminance value.

Thus, the apparatus requires no such accurate sunset and sunrise time, presets a predetermined illuminance value, and detects varying time of the detected illuminance value twice daily on the basis of the predetermined illuminance value, for example, in the case where the illuminance value is preset to 50 Lux or 100 Lux, varying time of the detected illuminance value on the basis of 50 Lux or 100 Lux daily.

That is, time A that is varied from 50 Lux to 49 Lux and time B that is varied from 49 Lux to 50 Lux are detected respectively. Herein, the microcontroller sets intermediate time between time A and time B to 12:00 PM on a virtual timepiece.

In the case where the illuminance value is preset to 100 Lux, time C which is varied from 100 Lux to 99 Lux and time D which is varied from 99 Lux to 100 Lux are detected respectively. Herein, the microcontroller sets intermediate time between time C and time D to 12:00 PM on the virtual timepiece.

Thus, the apparatus controls the lighting lamp to be turned-on at the same time with no regard to used-locations such as countries or rooms, and each reference time which sets the time axis is the same on the same day, with no regard to the predetermined illuminance values of the illuminance sensor, for example, with no regard to 50 Lux or 100 Lux.

According to the present invention, the apparatus requires no additional memory for storing a large quantity of data such as nighttime length data and varying time data. That is, since the apparatus requires the specific period of time for detecting predetermined illuminance value using the illuminance sensor everyday, and sets intermediate time of the nighttime (for example, 00:30 AM, 01:00 AM, 01:30 AM, or the like) to 12:00 PM on the virtual timepiece, the apparatus can set the virtual timepiece using only a memory embedded in the microcontroller. Thus, in the case where the reference time of the virtual timepiece is preset, when the lighting lamp turn-on time preset by the virtual timepiece arrives, the microcontroller turns on the lighting lamp.

Referring to FIG. 3, the method for controlling the lighting lamp will be explained in detail. To begin with, when a security key is input (S101), the microcontroller determines whether the security key is manipulated (S102). If the security key is not manipulated-, the microcontroller performs a normal on/off switching function of the lighting lamp (S109).

If the security key is manipulated, the microcontroller switches from the normal mode to a security mode (S103), and displays the switched state of the security mode (S104). That is, the microcontroller displays a message indicating that the security mode is in progress. In addition, if the current state is the normal mode, the microcontroller waits for an additional key input.

Next, the microcontroller determines whether the current state is the security mode (S105). When the current state is the security mode, the microcontroller receives the illuminance value that is detected using the illuminance sensor, reads the 24 hour-timepiece, and determines whether current time is nighttime or daytime (S106).

If the current time is daytime, the microcontroller turns-off the lighting lamp (S107), and the microcontroller determines again whether the current state is the security mode (S105). If the current time is nighttime, the microcontroller controls on/off of the lighting lamp according to the on/off timer program that is loaded in the microcontroller (S108). More particularly, the microcontroller stores varying time A when the detected illuminance value is below (or above) the predetermined illuminance value, on the basis of the predetermined illuminance value detected through the illuminance sensor.

In addition, the microcontroller determines whether turning on/off time of the lighting lamp today according to yesterday reference time of the virtual timepiece arrives, and stores varying time B when the detected illuminance value is above (or below) the predetermined illuminance value, on the basis of the predetermined illuminance value detected through the illuminance sensor. The microcontroller sets intermediate time between the time A and the time B to 12:00 PM on the virtual timepiece.

Thus, the method controls the lighting lamp to be turned-on for specific time periods that are preset to the virtual timepiece, automatically responding to a variation of length of night and sunrise. Meanwhile, the microcontroller determines again whether the current state is the security mode (S105). That is, the microcontroller waits for an additional key input.

In order to turn-on the lighting lamp at the predetermined time periods (for example, at a specific dusk time period, a specific midnight time period and a specific dawn time period), the apparatus according to the present invention uses the on/off timer program in the microcontroller, and updates nighttime length data (not shown) everyday or every week by using both the illuminance sensor (CDS) and the timer. In this way, the present invention performs the security mode by turning-on the lighting lamp for exactly the specific time period.

The apparatus for controlling the lighting lamp with the security function does not control the lighting lamp to be turned-on only using the timer. In addition, the apparatus does not control the lighting lamp to be turned-on at nighttime and to be turned-off at daytime using only the illuminance sensor (CDS). Consequently, the apparatus accurately controls the lighting lamp to be turned-on or off using simultaneously the timer, the microcontroller and the illuminance sensor. In addition, the apparatus requires no additional memory for storing nighttime length data and varying time data as was mentioned above.

Figure 5:
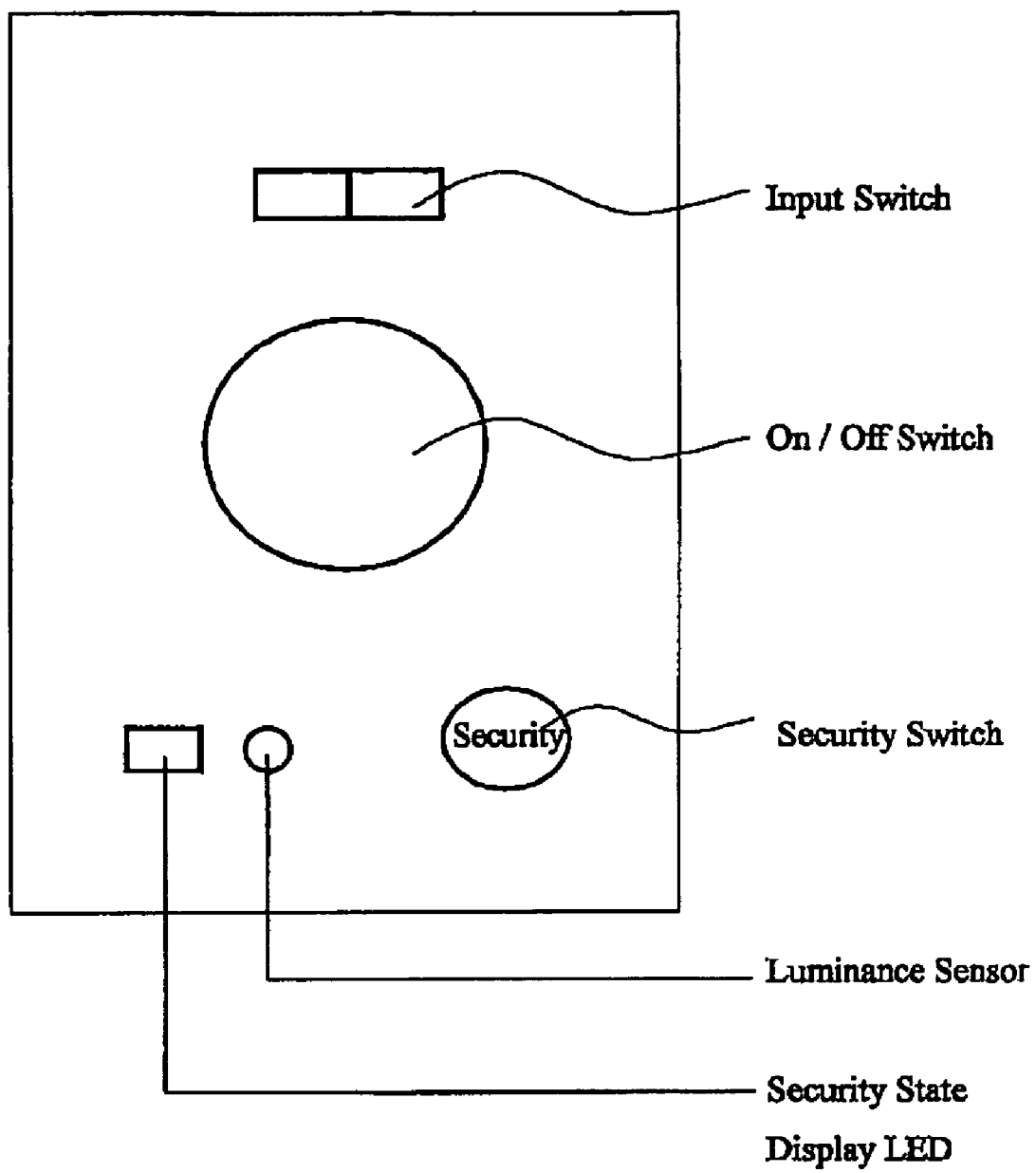
FIG. 5 is a view illustrating the external configuration of an apparatus for controlling a lighting lamp with a security function according to an embodiment of the present invention.

FIG. 4 is a view illustrating lighting lamp control states of an apparatus for controlling a lighting lamp with a security function according to an embodiment of the present invention. As illustrated in FIG. 4, (1) indicates that the microcontroller detects brightness using the illuminance sensor (CDS) and determines whether the current time is nighttime or daytime and (2) indicates a timing diagram for performing the security function according to the above method. FIG. 5 is a view illustrating the external configuration of an apparatus for controlling a lighting lamp with a security function according to an embodiment of the present invention.

As is apparent from the above description, the present invention provides an apparatus and method for controlling a lighting lamp having a security function, wherein, the apparatus controls the lighting lamp to be turned-on at a specific dusk time period, a specific midnight time period and a specific dawn time period using an illuminance sensor, a timer and a microcontroller, and the apparatus receives an illuminance detection signal provided through the illuminance sensor and updates lighting start time responding to a variation of length of night and start-time of night, and thereby the lighting lamp can be automatically controlled, and the security function with low power consumption can be performed in response to night length. In addition, since the apparatus automatically turns-on or off the lighting lamp with no additional complicated time-reservation for turning-on the lighting lamp at a specific time period at which burglaries frequently occur, even old people or children can easily execute the security mode.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. An apparatus for controlling a lighting lamp, which is included a security function, the lighting lamp controlling system comprising:

a power circuit block (1) for driving the lighting lamp controlling system, an input power detection block (2) for supplying AC input power, a triac (TRC) driving block (3) for switching the lighting lamp, said lighting lamp adapted to be automatically turned on for a specific time period when the security function is set, a control block (4) consisting of a security switch (SW2) for selecting a security mode from a regular lighting mode; a light emitting diode (LED) for indicating a status of the security mode according to manipulation of the security switch; an illuminance sensor set (CDS) to a predetermined illuminance threshold and adapted to detect a varying time period according to the predetermined illuminance threshold and to output an illuminance detection signal; a microcontroller (U1) adapted to receive the illuminance detection signal from the illuminance sensor if the security mode is selected to control the lighting lamp; a timer adapted to measure time to identify when the specific time period has elapsed; and a peripheral circuit block, wherein, said microcontroller (U1) detects the varying time period by determining when the illuminance detector detects a transition of an illuminance value from below the predetermined illuminance threshold to above the predetermined illuminance threshold and determining when the illuminance detector detects a transition of an illuminance value from above the predetermined illuminance threshold to below the predetermined illuminance threshold, sets an intermediate time between the two determined transitions to 12:00 PM on a virtual timepiece as a reference time, performs the security function by controlling the lamp to be automatically turned on for a specific time period at dusk, a specific time period at midnight and a specific time period at dawn, the specific time periods preset by the virtual timepiece according to the security mode selected by the user, and updates a turn on time of the lamp by automatically applying a varying value of the virtual timepiece which corresponds to a variation of a time between sunset and sunrise.

* * * * *